W. G. CARRICO.
AIR INLET CONTROL MEANS FOR FURNACES.
APPLICATION FILED NOV. 23, 1921.
1,418,776.
Patented June 6, 1922.
2 SHEETS—SHEET 1.
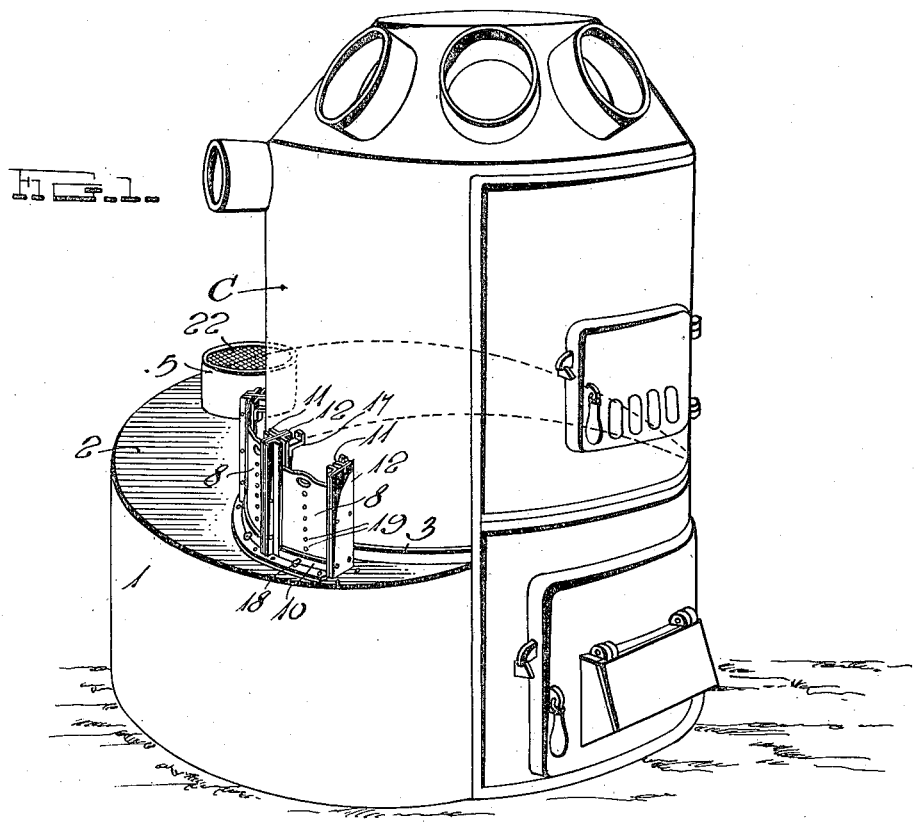
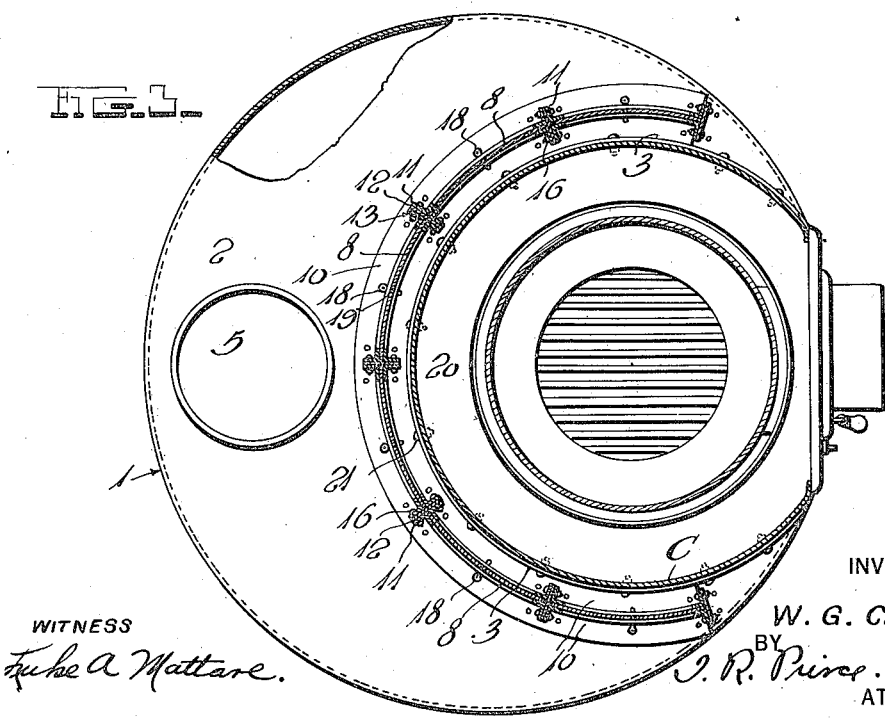
WITNESS
INVENTOR
W. G. CARRICO
BY
ATTORNEY W. G. CARRICO.
AIR INLET CONTROL MEANS FOR FURNACES.
APPLICATION FILED NOV. 23, 1921.
1,418,776.
Patented June 6, 1922.
2 SHEETS—SHEET 2.
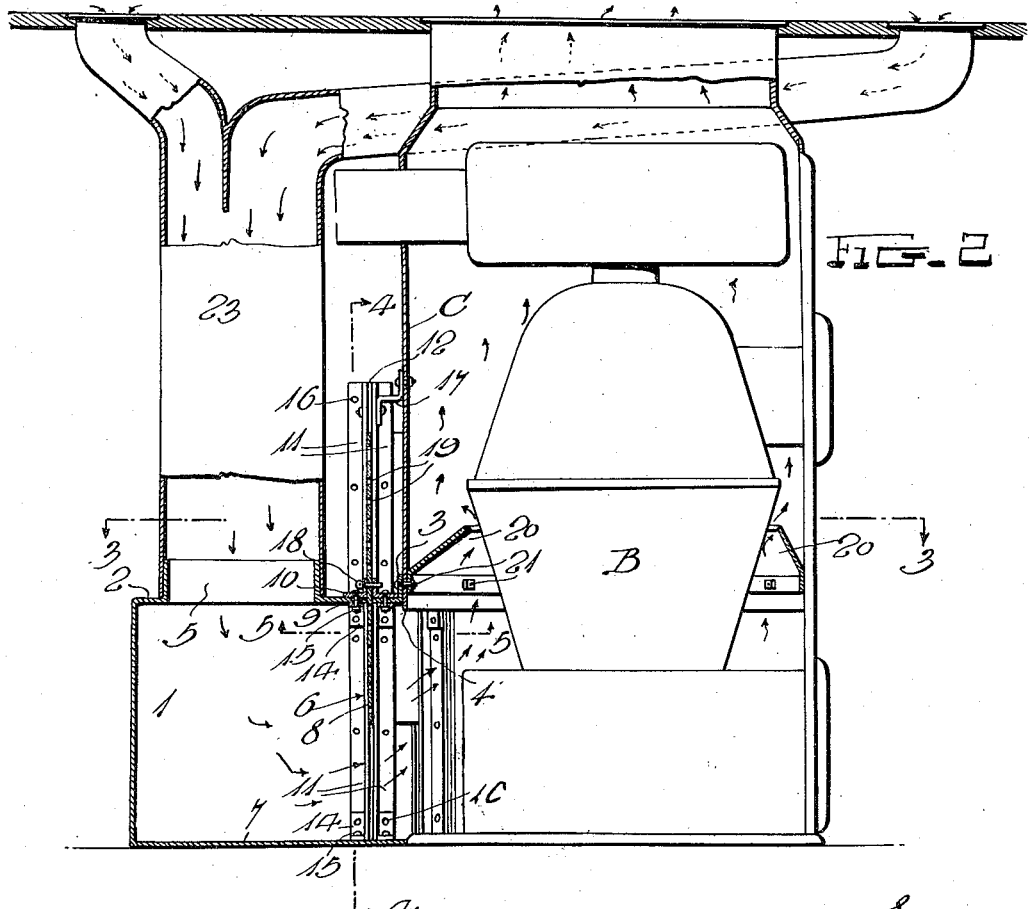
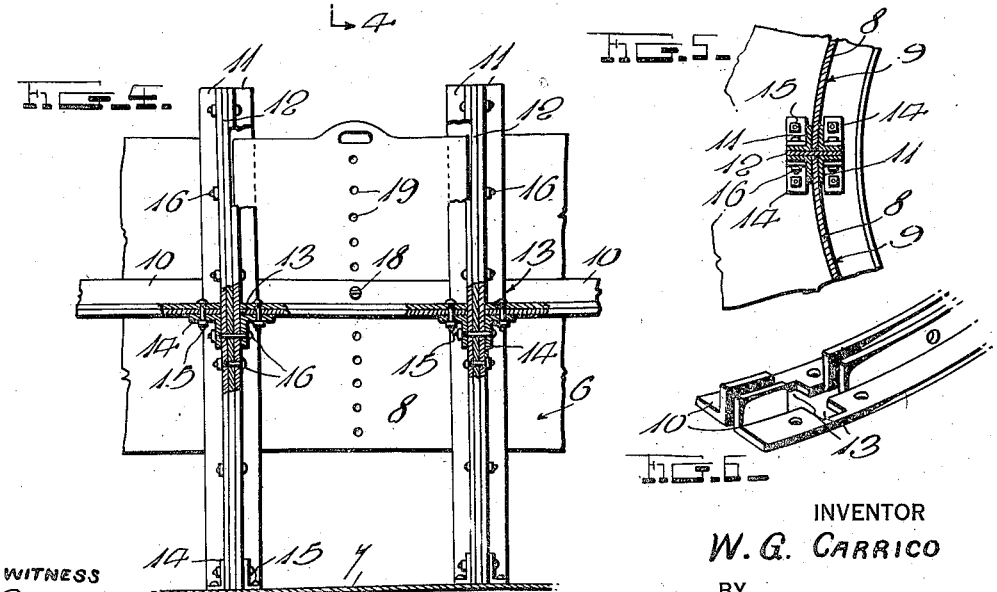
WITNESS
Luke A. Mattare
INVENTOR
W. G. CARRICO
BY
J. R. Price
ATTORNEY

UNITED STATES PATENT OFFICE.

WILLIAM G. CARRICO, OF WASHINGTON, DISTRICT OF COLUMBIA.

AIR-INLET-CONTROL MEANS FOR FURNACES.

1,418,776.   Specification of Letters Patent.   Patented June 6, 1922.

Application filed November 23, 1921. Serial No. 517,346.

*To all whom it may concern:*

Be it known that I, WILLIAM G. CARRICO, a citizen of the United States, residing at Washington, in the District of Columbia, have invented certain new and useful Improvements in Air-Inlet-Control Means for Furnaces, of which the following is a specification.

My invention relates to hot air furances and more particularly to a novel arrangement of parts for controlling the passage of air to the furnace casing or shell. Heretofore on the multiple pipe furnaces it has been customary to have an air inlet pipe leading into the lower end of the furnace casing from the atmosphere and while this pipe is provided with a damper for controlling the amount of air entering, this air is not distributed around the shell but enters at one point only, with the result that the air as it is heated, rises directly to the escape pipe or pipes directly over the air inlet pipe, but does not spread sufficiently in the casing to be distributed properly to all of the heat escape pipes. This very often causes an extremely hot blast of air to be supplied to some registers, while others receive practically no heat. Equal distribution of incoming air around the fire box and radiator and consequent high efficiency have been obtained in some of the well known pipeless furnaces, in which the incoming air passes downwardly between inner and outer casings and enters the former under its lower edge. However, a number of furnaces of the one pipe type have an air inlet in one side only of the casing and hence the incoming air is not distributed properly around the firebox and radiator with the result that heating efficiency is lost. Even with the proper distribution of the incoming air in the furnace casing, maximum heating efficiency cannot be obtained without proper control of this air, as with some furnaces it is necessary to supply a large amount of air, while in others it is advisable to choke down the amount of air supplied.

With the conditions above mentioned in view, one object of my invention is to provide for properly distributing the air within the lower end of the furnace casing so that it will rise uniformly around the fire pot and associated parts, instead of rising at one side only thereof, the outcome being a vast increase in heating efficiency over the present day types of furnaces having an air inlet at one side only.

A further aim of my invention is to make provision for checking the passage of air into the furnace shell to a greater or less extent as required, according to the make of furnace and individual conditions which may be encountered.

Yet another object is to provide for admitting different quantities of air at different points around the circumference of the furnace, permitting a greater volume of air to be supplied to some of the heat escape pipes and less to others, so as to most effectively distribute the heat in the building.

With the foregoing in view, the invention resides in the novel subject matter hereinafter described and claimed, the descriptive matter being supplemented by the accompanying drawings.

Figure 1 is a perspective view of an ordinary hot air furnace equipped with my invention.

Figure 2 is a vertical sectional view of a one pipe or pipeless furnace and the improvements attached thereto.

Figure 3 is a horizontal sectional view on line 3—3 of Fig. 2.

Figure 4 is a vertical sectional view on line 4—4 of Fig. 2.

Figure 5 is a horizontal sectional view on the plane of line 5—5 of Fig. 2.

Figure 6 is a detail perspective of a portion of the casing reinforcing rings hereinafter described.

In the drawings above briefly described, the numeral 1 designates an arcuate, preferably crescent shaped casing which is adapted to surround the lower end of a furnace casing C, the top 2 of said casing 1 being provided with a flange 3 to be bolted to said furnace casing. In Fig. 1, I have shown the casing 1 secured to an ordinary multiple pipe hot air furnace, while in Figs. 2 and 3 it is shown applied to a one pipe or pipeless furnace. In either instance the lower end of the furnace casing C is cut away as indicated at 4 to permit the air from casing 1 to enter said casing C substantially throughout its circumference, so as to distribute this air around the firebox B and associated parts. The air inlet 5 of the casing 1 is preferably in its top 2 and said casing is provided with an inner wall 6 which extends downwardly from its top between said inlet 5 and the flange 3, said wall 6 terminating in spaced relation with the casing bottom 7. By this arrangement, the air cannot rush directly from the inlet 5 into the casing C, but must spread within the entire upper portion of the casing 1, from which it may enter casing C under the wall 6, with the result that it will be properly distributed in said casing C, around the firebox B.

While the wall 6 may be rigid with the casing 1 or may be bodily adjustable upwardly and downwardly to vary the amount of air supplied to the casing C, I prefer to form said wall of a plurality of vertically adjustable damper plates 8, so that the quantities of air entering the casing C at different points around its circumference, may be controlled to obtain the most advantageous results. The damper plates 8 extend through a slot 9 which follows the inner edge portion of the top 2 and said top is reinforced along both sides of this slot, by arcuate bars 10 usually of angle iron. Guiding tracks 11 are provided for the damper plates 8 and these tracks are also preferably formed of angle iron. In the most desirable form of construction, these tracks are bolted to opposite sides of spaced vertical plates 12 which extend across the slot 9, and in most instances, the bars 10 are cut out as shown at 13 in Figs. 4 and 6, in order that the tracks 11 and the plates 12 may pass therethrough as illustrated in Figs. 2 and 4. These tracks 11 and plates 12 extend a suitable distance and are secured to the top 2, bars 10 and bottom 7, by bolts 15 passing through brackets 14 which are secured to said tracks by some of the bolts 16 which secure the tracks and plates together. The upper ends of the tracks 11 are by preference secured to the casing C by means of bolts and brackets 17. By employing the construction described, not only are the necessary guides provided for the damper plates 8, but it will be seen that the plates 12 and tracks 11 tie the portions of the top 2 at opposite sides of the slot 9, rigidly together.

The damper plates 8 may be uniformly adjusted if the same amount of air is to be supplied to the casing C at all points throughout its circumference, or said plates may be differently adjusted to permit unequal amounts of air to enter at different points, according to conditions encountered. The plates 8 may be held in adjusted position by any desired means, such as the pins 18 insertible through openings 19 in said plates.

In connection with my invention, I prefer to use an annular baffle or air diffusing plate 20 secured to the casing C as shown preferably by the bolts 21 which secure the casing 1 to said casing C. This plate assists materially in properly distributing the air around and bringing it into intimate contact with the firebox B, so as to insure maximum heating efficiency.

It may be added that the air inlet 5 may be screened as at 22 in Fig. 1 and receive its air directly from the furnace room, or an air supply pipe may lead to said inlet from any suitable source. In connection with Fig. 2, I have shown a branched pipe 23 leading to the inlet 5 from registers in the floor above, and this or a similar arrangement is preferably used on a pipeless furnace having a single casing, such as illustrated in this view.

From the foregoing, it will be seen that I have provided a very simple and inexpensive construction for carrying out the objects of the invention and it will be clear that the latter is not restricted to the precise details shown, but may be modified as numerous conditions and makes of furnaces may require. Also, while I prefer to construct the device in the form of an attachment for well known furnaces, it may be built as a part of the furnace at the time of manufacture, if desired.

I claim:

1. An air distributing attachment for hot air furnaces comprising a relatively long arcuate air supply casing adapted to extend around a cut-away lower end portion of a furnace casing and of considerably less height than the latter, said arcuate casing being closed at its outer curved side, top and bottom, and open at its inner curved side for communication with the furnace casing through its cut-away portion, whereby to distribute the incoming air within the furnace casing and cause it to substantially surround the fire box, said arcuate casing being provided with means for securing its inner curved side against the furnace casing.

2. A structure as specified in claim 1; said arcuate casing having its air inlet in its upper portion and being provided with a wall extending downwardly from its top between said inlet and the furnace-engaging portion of the casing for the purpose set forth.

3. A structure as specified in claim 1; said arcuate casing having its air inlet in its upper portion and being provided with a vertically adjustable wall extending downwardly from its top between said inlet and the furnace-engaging portion of the casing for the purpose set forth.

4. A structure as specified in claim 1; said arcuate casing having its air inlet in its upper portion and being provided with a plurality of independently adjustable dampers jointly forming a wall extending downwardly from the casing top between said air inlet and the furnace-engaging portion of the casing for controlling the discharge of air at different points into the furnace casing.

5. A structure as specified in claim 1; the top of said casing having a slot following its inner edge portion, reinforcing bars secured to said casing top along opposite sides of said slot, vertical tracks secured to said bars, and vertically adjustable damper plates guided by said tracks and extending through said slot.

6. A structure as specified in claim 1; the top of said casing having a slot following its inner edge portion, reinforcing bars secured to said casing top along opposite sides of said slot, a plurality of spaced vertical plates passing across said slots and extending vertically from the casing top, a pair of parallel vertical tracks secured to each side of each plate and secured to said reinforcing bars, and vertically adjustable damper plates guided by said tracks and extending through said slot.

7. A structure as specified in claim 1; the top of said casing having a slot following its inner edge portion, reinforcing bars secured to said casing top along opposite sides of said slot, a plurality of spaced vertical plates passing through said reinforcing bars and extending across said slot, a pair of vertical tracks secured to each side of each of said plates and also extending through said reinforcing bars, said tracks being secured to said bars, and vertically adjustable damper plates guided by said tracks and extending through said slot.

8. A structure as specified in claim 5; said tracks extending to the bottom of the casing and being secured thereto.

9. A structure as specified in claim 6; said vertical plates and said tracks extending to the bottom of the casing and being secured thereto.

In testimony whereof I affix my signature.

WILLIAM G. CARRICO.